Oct. 10, 1939. J. S. IRVINE 2,175,195
SPRING TAKE-UP FOR FILTER UNITS
Filed July 30, 1937
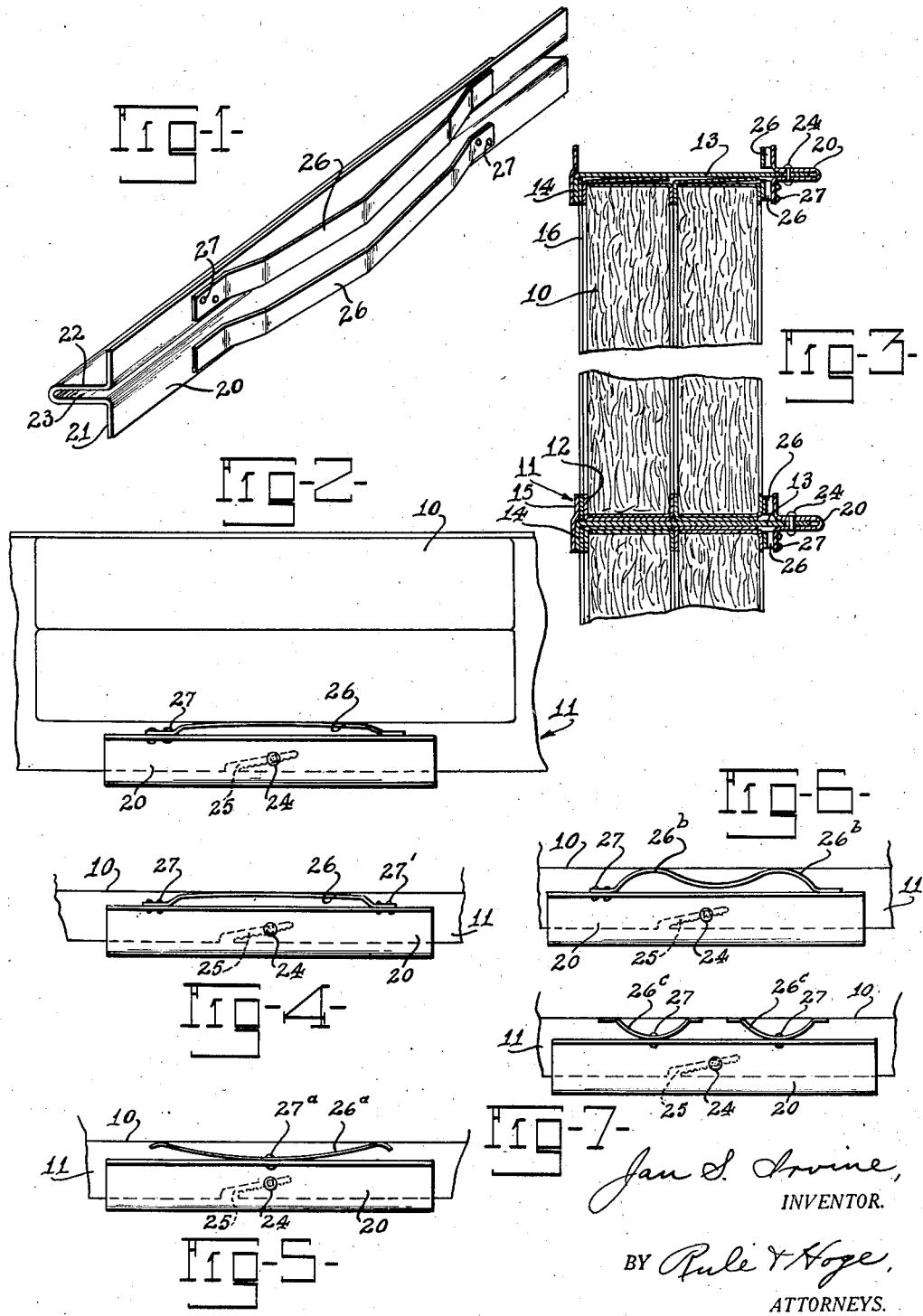
INVENTOR.
BY
ATTORNEYS.

Patented Oct. 10, 1939

2,175,195

UNITED STATES PATENT OFFICE 2,175,195

SPRING TAKE-UP FOR FILTER UNITS

Jan S. Irvine, Toledo, Ohio, assignor, by mesne assignments, to Owens-Corning Fiberglas Corporation, a corporation of Delaware Application July 30, 1937, Serial No. 156,558

3 Claims. (Cl. 183—47)

My invention relates to air and gas filters, particularly of the type in which the individual filter units are removably mounted in a supporting frame. In filtering apparatus of this type, it is necessary or desirable to provide sealing means by which leakage or by-passing of the air or gas is prevented. Such sealing means ordinarily consists of a gasket or the like interposed between the filter unit and the frame or the walls of the cell in which the unit is mounted. The filter unit is commonly held in position within the frame by a locking member or bar. Such locking member holds or forces the filter back against a seating flange on the frame, with the gasket interposed between said frame and the back of the filter.

In practice, it is often found difficult or impossible to maintain a substantially air-tight seal, even when a close fit is provided at the time the unit is installed. There is a tendency for the filter unit to swell when subjected to dampness, or to dry out and shrink. With conventional apparatus such as above indicated, there is no adequate means provided to accommodate this swelling or shrinking of the filter unit after it has been secured in place in the supporting frame. As a result looseness develops, permitting undesirable air leakage.

An object of my invention is to overcome this difficulty by the provision of suitable means for automatically taking up any looseness and in this manner maintaining an effective seal.

A more specific object of the invention is to provide spring means in combination with the clamping device, for maintaining a continuous yielding pressure against the filter unit in a manner to maintain an effective seal regardless of shrinking or swelling of said unit due to changes in temperature, moisture conditions, or other causes.

Other objects of the invention will appear hereinafter.

Referring to the accompanying drawing:

Fig. 1 is a perspective view of a clamping or locking bar provided with spring means for holding the filter units in position;

Fig. 2 is a diagrammatic plan view of a filter assemblage, showing means for holding the filter units in a cell;

Fig. 3 is a sectional elevation of the same; and

Figs. 4, 5, 6 and 7 are diagrammatic views showing various modified forms of the spring holding means.

Referring particularly to Figs. 2 and 3, filter units or packages 10 are mounted in a supporting frame 11. Each filter unit comprises a body of loosely matted glass fibers or other base of suitable filter material. The filter unit includes a frame 12 in which the mat of fibers is supported, said frame comprising telescoping sections consisting of chip-board, stiff paper, or other suitable material for giving the required strength, stiffness and integrity to the filter unit.

The framework 11 in which the filter units are mounted may be of conventional construction comprising rectangular cells to receive the filter units. Such a construction is shown, for example, in the patent to Collins, No. 1,898,424, February 21, 1933. The frame 11 as herein shown comprises horizontal frame members 13 forming the top and bottom walls of the cells, corresponding vertical frame members being provided to form the end walls of the cells. As shown in Fig. 3, the rear marginal portion of each frame member 13 is bent downward in the form of a flange 14, the inner surface of which provides a vertical surface forming an abutment for the upper end of a filter unit. Strips 15 which may be secured to the frame members 13 provide similar abutments for the lower margins of the juxtaposed filter units.

As herein shown, two filter units 10 are mounted one behind the other within each cell, although a greater or less number may be used if desired. Interposed between the innermost filter unit and the frame members 14, 15 is a gasket 16 of felt or other soft yielding material suitable for forming a seal between the filter unit and the cell walls.

The filter units are held in place within the frame cells by means of a locking bar or member 20 which is readily removable to facilitate a quick removal or replacement of the filter units. The locking bar comprises a strip of sheet metal or the like bent to form longitudinally extending marginal portions or flanges 21 having their surfaces in a vertical plane, and an intermediate horizontally disposed body portion 22 substantially U-shaped in cross section. The locking bar 20 has sliding engagement with the frame member 13 which enters the longitudinal slot or groove 23 in the body 22. A pin 24 fixed to the locking bar and extending through the slot 23, is arranged to engage an inclined slot 25 formed in the frame piece 13, for holding the locking bar in place.

In order to maintain a yielding pressure of the filter units against the cell walls or the interposed sealing gasket, I provide spring means interposed between the locking bar 20 and the filter units. Such spring means may comprise one or more leaf springs 26 attached to the locking bar. As shown in Fig. 1, each of the leaf springs 26 is attached, by means of rivets 27 or the like, on the inner or active face of a flange member 21, that is, the face presented toward the filter unit. The springs 26 are bowed as shown, so as to contact at an intermediate point with the filter unit, one end of the spring being free for sliding movement along the locking bar 20 when the spring is placed under pressure.

It will be seen that with this construction, when the locking bar is in position (Fig. 2), the springs 26 continuously exert a yielding pressure against the filter units whereby said units are caused to bear at all times with a yielding pressure against the sealing gasket. In this manner, an effective seal is maintained regardless of swelling or shrinking of the filter units due to moisture, heat, or other causes. This construction also permits a much greater tolerance in the filter units and frames without introducing looseness or permitting air leakage.

Fig. 4 illustrates a modification in which the leaf springs 26 are anchored at both ends as by means of rivets 27 and 27'.

Fig. 5 illustrates a further modification in which leaf springs 26ᵃ are attached at their middle by rivets 27ᵃ to the locking bar 20. In this construction both ends of the spring are free and bear against the filter unit, the ends of the spring being bowed outwardly or away from the locking member.

Fig. 6 shows a further modification in which the spring assumes the form of a compound curve comprising a plurality of outwardly bowed portions 26ᵇ to contact with the filter unit.

Fig. 7 shows a further modification in which a plurality of bowed springs 26ᶜ are provided, said springs being positioned at different points lengthwise of the locking member.

Modifications may be resorted to within the spirit and scope of my invention.

I claim:

1. A bar locking device adapted to hold a filter unit in a frame, said locking device having flange portions extending lengthwise thereof, and leaf springs secured to said flange portions in such a manner that the springs have long, flat, bearing surfaces in contact with the filter unit when said locking device is in its holding position.

2. A locking bar adapted to hold a filter unit within a frame, and a leaf spring secured to said bar in such manner that the spring has a long, flat, bearing surface in contact with the filter unit when the locking bar is in its holding position.

3. A locking bar adapted to hold a filter unit in a frame, leaf spring means secured to the locking bar in a manner to provide bearing surfaces arranged to contact with the filter unit at widely spaced points and hold said unit with a yielding pressure within said frame.

JAN S. IRVINE.